(12) United States Patent
Jung et al.

(10) Patent No.: US 7,247,258 B2
(45) Date of Patent: Jul. 24, 2007

(54) COMPACT PARTIAL OXIDATION REACTOR ASSEMBLAGE WITH FAST START-UP CAPABILITY

(75) Inventors: Heon Jung, Daejeon (KR); Jang Sik Shin, Daejeon (KR); Ho-Won Ra, Daejeon (KR); Ho-Tae Lee, Daejeon (KR); Wang-Lai Yoon, Daejeon (KR); Jong-Soo Park, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 513 days.

(21) Appl. No.: 10/735,257

(22) Filed: Dec. 12, 2003

(65) Prior Publication Data

US 2005/0069485 A1    Mar. 31, 2005

(51) Int. Cl.
    *C01B 3/26* (2006.01)
(52) U.S. Cl. ...................................... 252/373
(58) Field of Classification Search .................. 252/373
    See application file for complete search history.

(56) References Cited

U.S. PATENT DOCUMENTS

| | | | | |
|---|---|---|---|---|
| 5,877,377 A | * | 3/1999 | Golunski et al. ........... | 585/624 |
| 5,883,138 A | * | 3/1999 | Hershkowitz et al. ...... | 518/703 |
| 6,221,280 B1 | * | 4/2001 | Anumakonda et al. ..... | 252/372 |
| 6,254,807 B1 | * | 7/2001 | Schmidt et al. ............. | 252/373 |
| 6,267,912 B1 | * | 7/2001 | Hershkowitz et al. ...... | 252/373 |
| 6,280,864 B1 | * | 8/2001 | Towler et al. ................ | 429/17 |
| 6,329,434 B1 | * | 12/2001 | Wen et al. ................... | 518/703 |
| 6,761,838 B2 | * | 7/2004 | Zeng et al. .................. | 252/373 |
| 6,911,161 B2 | * | 6/2005 | Xu et al. ...................... | 252/373 |
| 7,074,838 B2 | * | 7/2006 | Colman et al. ............. | 518/702 |
| 7,105,107 B2 | * | 9/2006 | Ramani et al. ............. | 252/373 |
| 7,122,170 B2 | * | 10/2006 | Ramani et al. ............. | 423/650 |

* cited by examiner

*Primary Examiner*—Wayne A. Langel
(74) *Attorney, Agent, or Firm*—Van Pelt, Yi & James LLP

(57) ABSTRACT

A method for converting hydrocarbon fuels to hydrogen and carbon monoxide through catalytic partial oxidation is described. The process comprises a reactor containing both an electrically heated catalyst as a start-up device and novel-metal-washcoated metallic monolith catalysts and a heat exchanging device. The partial oxidation reaction becomes ignited in less than 1.5 minute when the gaseous hydrocarbon fuel and oxygen-containing gas mixture is in contact with an electrically heated catalyst. The reaction takes place over the metallic monolith catalyst washcoated with noble metal (typically Pd/alumina-cerium oxide). The near complete conversion of hydrocarbon fuels with high hydrogen and carbon monoxide selectivities is achieved by preheating the feed mixture heat-exchanged with hot product gas stream.

13 Claims, 4 Drawing Sheets

COMPACT PARTIAL OXIDATION REACTOR ASSEMBLAGE WITH FAST START-UP CAPABILITY

CROSS REFERENCE TO RELATED APPLICATIONS

This application claims priority to Korean Patent Application No. 2003-0067042, entitled COMPACT PARTIAL OXIDATION REACTOR ASSEMBLAGE WITH FAST START-UP CAPABILITY filed Sep. 26, 2003 which is incorporated herein by reference for all purposes.

FIELD OF THE INVENTION

The present invention relates to methods of preparing a mixture of hydrogen and carbon monoxide by catalytic partial oxidation of methane, natural gas or other hydrocarbons.

BACKGROUND OF THE INVENTION

Compact reformers find increasing use for fuel cells and small-scale hydrogen generators such as on-board reformers. In addition to fuel cell vehicle application, on-board reformers can be used to supply small amounts of hydrogen or syngas (mixture of hydrogen and carbon monoxide) either to gasoline internal combustion engines or to pollution treatment devices of the vehicle to increase the NOx removal efficiency. The three most important requirements of on-board reformers are compactness, fast start-up capability and low pressure-drop characteristics. Catalytic partial oxidation (CPOX) reformers can meet these requirements.

Numerous documents related to CPOX processes are contained in the literature. However, the majority of these processes are restricted to catalyst compositions and catalyst structures, which need further steps of development for the complete form of the reactor assembly to be readily applied in the real practices including the start-up device.

A. T. Ashcroft et al. ("Selective oxidation of methane to synthesis gas using transition metal catalysts", Nature, Vol. 344. 319-321, 1990) disclose methane oxidation to syngas on several rare earth-ruthenium mixed oxide catalysts. At contact times of about 0.1 s and temperatures above 750° C., the powdered catalysts effectively convert methane to syngas.

Similar example of the mixed oxide catalyst utilized in the CPOX reaction disclosed in the U.S. Pat. No. 5,447,705 is the perovskite of LnxAl-yByO3 structure wherein Ln is at least on of La, Ce, Pr, Nd, Sm, En, Dy, Ho or Ef, A is Ti, Cr, Fe, Ru, Co, Rh, or Ni, B is Ti, Cr, Fe, Ru, Co, Rh or Ni.

Another example of the CPOX catalyst composition by P. D. F. Vernon et al. ("Partial oxidation of methane to synthesis gas, and carbon dioxide as an oxidizing agent for methane conversion", Catalysis Today, Vol. 13, 417-426, 1992) discloses that the transition metals such as nickel, ruthenium, rhodium, palladium, platinum and iridium supported on inert oxides can catalyze methane to synthesis gas to the equilibrium value.

Similar disclosure of CPOX catalyst composition is described in U.S. Pat. No. 5,720,901, wherein rhodium, ruthenium and iridium were used to process sulfur-containing light hydrocarbons.

In terms of designing the CPOX reactor, there are problems associated with the shape of the catalyst. The powder form catalyst can not tolerate the feedstock gas at high gas space velocities due to severe pressure drop. The pellet catalyst can alleviate the pressure drop problems to a certain extent but less than optimum heat transfer can facilitate hot spots, resulting in performance degradation of catalysts. An open channel structured monolith catalyst can have more uniform temperatures through the heat dissipation by connecting walls while minimizing the pressure drop. Thus, the open channel structured monolith catalyst is the preferred form of the catalyst that can be adopted in the CPOX reactor operated at high space velocities.

The example of monolith catalyst application in CPOX is found in U.S. Pat. No. 5,648,582 disclosing that the ceramic monolith washcoated with a supported metal catalyst converted methane at space velocities within the range of 800,000 hr-1 to 12,000,000 hr-1.

When the catalyst in the form of ceramic monolith is used at high temperatures, the problem of catalyst breakdown can arise because of the susceptibility of the refractory monolithic catalytic structure to thermal shock. U.S. Pat. No. 5,639,401 discloses that the rhodium catalyst on alumina foam that had been subjected to the CPOX reaction became shattered into many fragments. In the same patent, the use of the ZrO2-based monolith type CPOX catalysts is disclosed that are resistant to thermal shock.

U.S. Pat. No. 5,786,296 discloses thin-walled monolithic iron oxide structures made from steels for the purpose of using them for heat exchangers, mufflers and catalyst carriers. Compared to ceramic monoliths, the monolith made of thin metal plates is more resistant to the thermal shock. Other advantages of thin-walled metal monolith are rapid heat-up capability and more uniform temperature distribution due to the higher thermal conductivity and the smaller thermal mass. Thus, metal monolith-based catalysts are well suited for compact CPOX reformers that require fast start-up capability. Although the possibility of utilizing metal monolith for the CPOX process is claimed in U.S. Pat. No. 5,648,582 and U.S. Pat. No. 6,221,280 B1, examples of metal monolith-based CPOX catalysts are not disclosed.

Another unique feature of the metal monolith is that it can be used as a start-up device for the CPOX reaction. When electricity is supplied to the metal monolith, it became heated resistively to raise the temperature of the gas passing through the channels of the monolith. The device is called "electrically heated (heatable) catalyst (EHC)". T. Kirchner et al. ("Optimization of the cold-start behavior of automotive catalysts using an electrically heated pre-catalyst", Chemical Engineering Science, Vol. 51, 2409-2418, 1996) and S. R. Nakouzi et al. ("Novel concept prototype low-power-consumption electrically heatable catalysts", AIChE Journal, Vol. 44, 184-187, 1998) disclose the use of electrically heated catalyst as the device to light-off combustion of CO and hydrocarbons in automotive exhaust gases. Since the use of EHC does not include any flame during operation, it is a safe start-up device. No EHC has been disclosed in the literature as a start-up device for the CPOX reaction.

Other method of igniting the CPOX reaction disclosed in U.S. Pat. No. 6,221,280 B1 is the use of an external heater to raise the temperature of the reactant gas to above the light-off temperature. The CPOX reactor assemblage employing an external heater is neither compact nor fast to be started. Another method of igniting the CPOX reaction disclosed in U.S. Pat. No. 5,648,582 is a sparker-ignited complete combustion of NH3 or CH4 to heat the catalyst to about 1000° C. followed by feeding the reactant gas mixture at a stoichiometric ratio of CH4/O2. The use of spark-ignited complete combustion as the start-up method may pose a danger of explosion and destruction of catalysts.

In addition to the adoption of very active catalyst, preheating the reactant gas mixture can also make the performance enhancement of the CPOX process. U.S. Pat. No. 5,648,582 discloses that air heated at 460° C. resulted in the significantly higher methane conversion than air at 25° C., however, the method of air preheating is not disclosed.

SUMMARY OF THE INVENTION

The present invention provides a stand-alone, compact reactor assemblage for catalytic partial oxidation of a hydrocarbon feedstock, which process comprises contacting a feed mixture of the hydrocarbon and oxygen-containing gas, firstly with a heat exchanger to be preheated by the hot product gas, secondly with an electrically heated catalyst to be rapidly ignited and finally with a catalyst in the form of novel metal washcoated metal monolith to be converted to hydrogen and carbon monoxide in high yields.

The present invention uses a metal monolith catalyst coated with palladium, ruthenium or platinum to achieve catalytic partial oxidation of the hydrocarbon feedstock at an increased space velocity. The high space velocity operation results in smaller catalyst volume to achieve the requirement of the compactness. The space velocity range for the present invention using methane at near atmospheric pressure is between 10,000-500,000 hr-1. Optimum range has been determined to be 40,000-150,000 hr-1. Palladium, ruthenium or platinum is washcoated on the metal monolith in the form of the supported catalyst on high- surface-area aluminum oxide promoted with cerium oxide and other alkali compounds. The range of washcoat loading is between 0.05-0.4 g per one square centimeter of the metal monolith. The metal loading ranges between 0.5-20 weight % of the washcoat.

The use of the above catalyst has produced several positive results. Thin walls of the metal monolith minimized the pressure drop to less than 1 psi even at space velocity of 150,000 hr-1. Low-pressure drop requires the minimum parasitic loss of a fuel reformer due to smaller compression duties. The high thermal conductivity of metal monolith guarantees a more uniform temperature of the catalyst, minimizing the formation of hot spots. Prevention of hot spots results in the longer life of the catalyst. The resistance of metal monoliths to the thermal shock also provides the longer life of the catalyst during repeated cycles of start-up/shut-down.

The reactor is started from ambient temperatures through the use of the electrically heated catalyst. The hydrocarbon feedstock and oxygen containing gas mixture is rapidly heated to about 270° C. by the EHC when the 20-40 volts of electricity is applied and the partial oxidation reaction becomes ignited in 1.5-8 minutes. The start-up process using an EHC is safe since the no flame is involved during the start-up period. The partial oxidation reaction continued to take place over the metal monolith catalyst even when the electricity supply to the EHC is terminated after the ignition. The said oxygen containing gas is the oxygen enriched air with the oxygen content from 21 volume percent to 100 percent.

The stand-alone CPOX reactor is operated in a near adiabatic mode without the external heater. The reactant gas mixture fed at the room temperature is heat-exchanged with the hot product gas by the heat exchanger before being fed to the reactor. The reactant gas mixture preheated to about 400° C. is converted almost completely to hydrogen and carbon monoxide.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
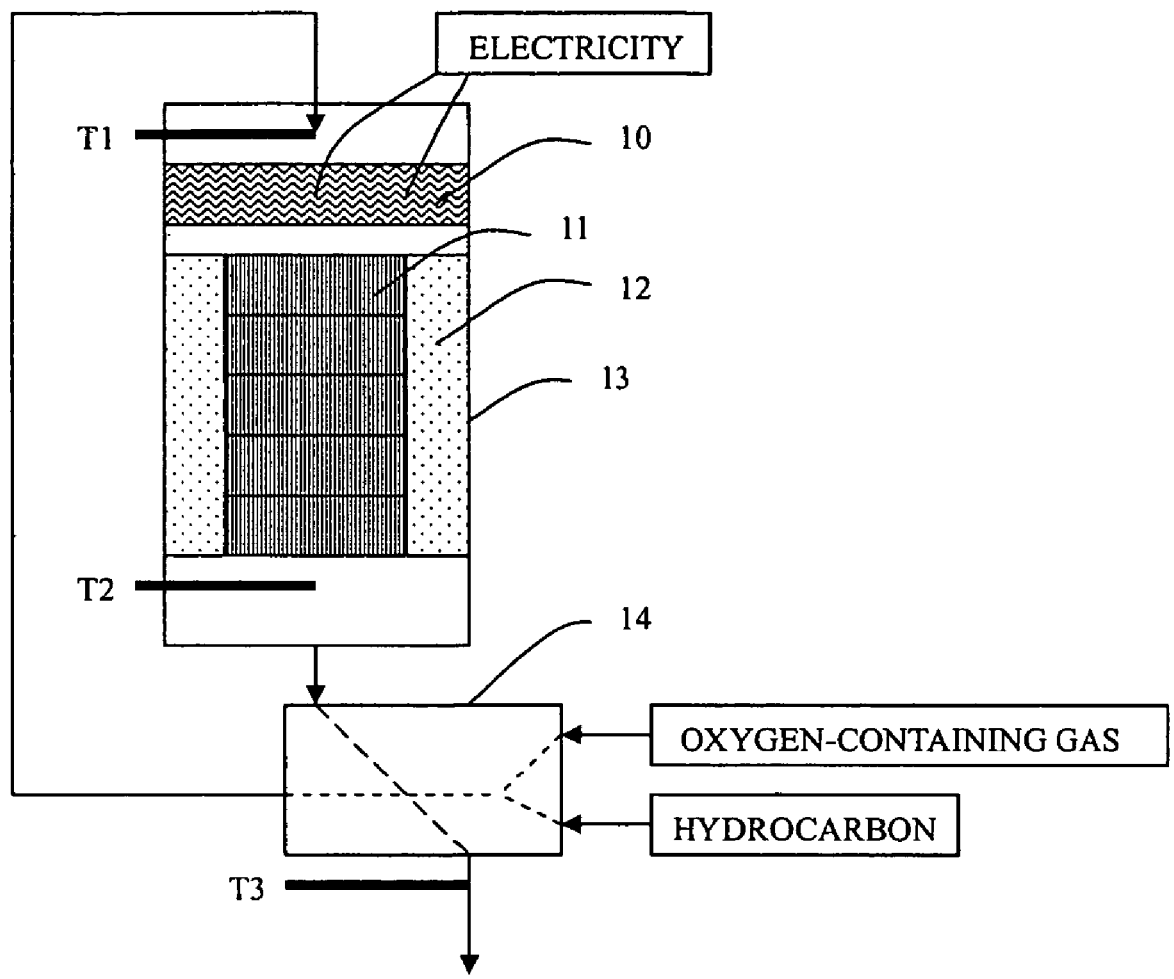
FIG. 1 is a schematic diagram of a catalytic partial oxidation reactor assemblage according to the embodiment of the present invention.

FIG. 1 schematically depicts a catalytic partial oxidation system that can be employed to carry out acts of the present invention. In general, the present invention provides for a hydrocarbon feed to be processed by catalytic partial oxidation. The hydrocarbon feed can comprise methane, natural gas, liquefied petroleum gas (LPG), naphtha, gasoline and diesel oil. The present invention can produce gas stream comprising carbon monoxide and hydrogen as the main reaction product.

The vaporized hydrocarbon feedstock is mixed with oxygen containing gas to be fed to the heat exchanger 14. The hot product gas stream from the reactor 13 provides heat to the reactant gas mixture entering the heat exchanger 14. The preheated reactant gas mixture enters to the partial oxidation reactor 13.

The first layer of the catalyst in the reactor 13 is the electrically heated catalyst 10. The electrically heated catalyst is prepared by welding electrical rods at both ends of the metallic monolith that was pretreated to prevent the short circuit. The metallic monolith is prepared by wounding a combination of a flat plate and a corrugated form of metal plate, preferably iron-chrome-aluminum alloy plate.

Underneath the EHC 10, layers of metal monolith catalysts 11 are installed in the reactor 13. The space between the catalyst and the reactor wall was filled with the high temperature insulation 12 to minimize the heat loss. Several thermocouples are installed in the system to monitor the performance of the reactor. Especially, T2 measures the temperature of the product gas stream that can be used as the indication of the reactor operating status.

Since the temperature of the gas at any location does not exceed 900° C., the reactor 13 and the heat exchanger 14 can be made of less exotic materials such as stainless steel.

Figure 2:
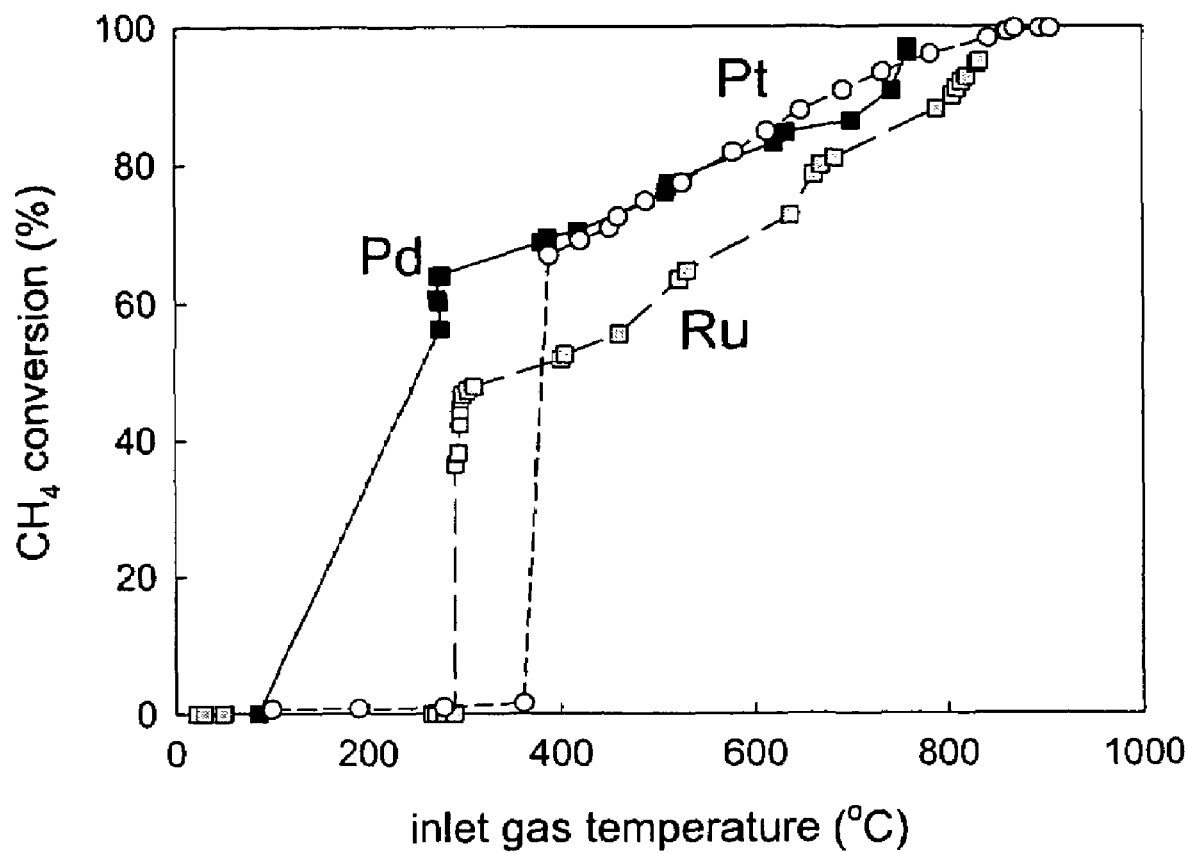
FIG. 2 illustrates the results of methane conversion for a Pd monolith, a Ru monolith and a Pt monolith as a function of a feed gas mixture temperature.

The said metal monolith is illustrated schematically in FIG. 2. The metal monolith (110) was prepared by wounding a combination of a flat plate (112) and a corrugated form plate (112) to form many cells (113) in honeycomb shapes with the cell density ranging from 50 to 1000 per square inch.

EXAMPLE 1

Catalyst Preparation

The catalyst was prepared by washcoating the supported noble metal catalyst onto the surface of the open channel metal monolith. The metal monolith was prepared by wounding a combination of a flat plate and a corrugated form plate (50 μm thickness fecralloy). The monolith has the cell density of about 640 cells per square inch. The monolith was pre-oxidized to enhance the adhesive force between the ceramic-type washcoated catalyst and the metal monolith. Highly concentrated slurry containing fine particles of the calcined product of alumina and cerium acetate was prepared and the appropriate amount of Pd nitrate, Ru nitrate or H2PtCl6 was dissolved in the slurry. Metallic monoliths were dipped into the slurry and dried at the room temperature several times until the desired amount of the catalyst was washcoated. The dried monolith was calcined in air with the calcination temperature programmed to increase up to 900° C. The amount of the washcoated catalyst was 0.16 g per one cm3 of the monolith. The amount of the impregnated novel metals was Pd: 4 weight %, Ru: 4 weight %, Pt: 20 weight % of the washcoat.

Tests were conducted to confirm the efficacy of the noble metal washcoated metal monolith catalysts. Two cylindrical metallic monolith washcoated with noble metal catalysts of 2 cm (diameter)×2 cm (height) size were charged into a quartz reactor with an inside diameter of 2.1 cm and the methane partial oxidation reaction was carried out at the space velocity of 19000 hr-1. The space velocity was defined as the ratio of the reactant gas flow rate at 20° C. and 1 atm to the total volume of the catalyst. The inlet gas temperature was measured at 4 cm above the catalyst and the space between the catalyst and the thermocouple was filled with the metallic monolith without the catalyst washcoat for the even distribution of the reactant gas. FIG. 2 shows that all three noble metal (Pd, Ru and Pt) washcoated metal monolith catalysts are efficient CPOX catalysts. Especially, the Pd catalyst is superior to other catalysts. The Pd-washcoated catalyst showed the higher CH4 conversion than the Ru catalyst at the same inlet gas temperature. The Pt-based metal monolith catalyst showed about the same methane conversion as the Pd-based catalyst but the partial oxidation reaction started at the much higher inlet gas temperature over the Pt washcoated catalyst. Once the CPOX reaction started, the catalyst exit temperature became higher than the inlet gas temperature due to the exothermic heat of the reaction. For example, the exit gas temperature from the Pd catalyst was 330° C. higher when the inlet gas temperature was 276° C.

EXAMPLE 2

Start-up

Figure 3:
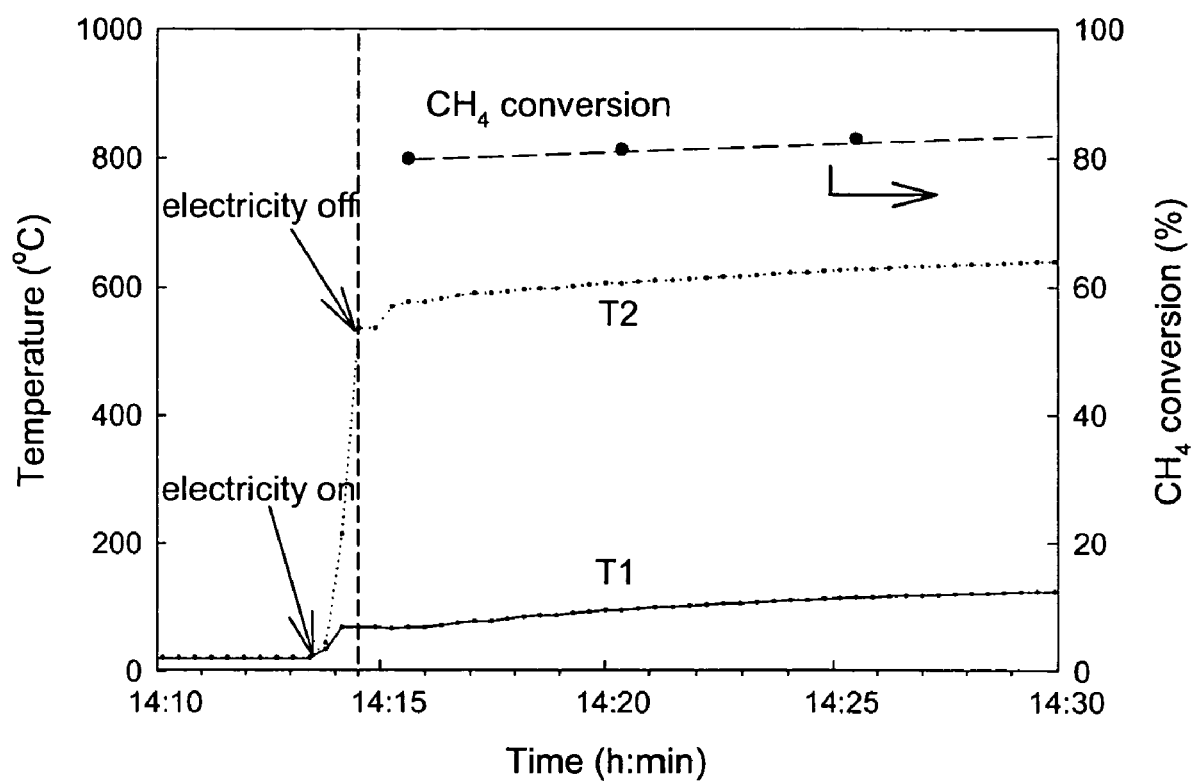
FIG. 3 is the graphical representation of the relationship of temperatures and methane conversion with time during ignition.

Five cylindrical monolith catalysts (3.5 cm diameter and 2 cm height; total volume: 96 cc) with Pd washcoat were charged into the stainless steel reactor of an inside diameter of 5.1 cm. The space between the catalyst and the reactor wall was filled with the high temperature insulation to minimize the heat loss. An EHC with the Pd catalyst washcoat was installed in front of the catalyst bed for the start-up of the CPOX reaction. This stand-alone reactor is equipped with only a thermal insulation without any external heater. The reactant gas flow rate was maintained at 71.5 l/min (O2 in air/CH4=0.553, GHSV=44,700 hr-1) and 30 V of electricity was supplied to the EHC. FIG. 3 shows the temperature profiles during the start-up period. The temperature at the exit of the catalyst layers (T2 in FIG. 1) increased to 580° C. within 1.5 minute of the electricity, indicating that the POX reaction started. Once the CPOX reaction was initiated, the electricity supply to the EHC was cut off. The reaction went on without heating from the EHC. The CH4 conversion during the start-up period was about 80%.

In separate runs with the EHC without the Pd-washcoat, the start-up of the reaction took place within 3-8 minutes of the electricity supply, manifesting the efficacy of the Pd-washcoated EHC as the start-up device for the CPOX reaction.

EXAMPLE 3

Heat Exchanger

Figure 4:
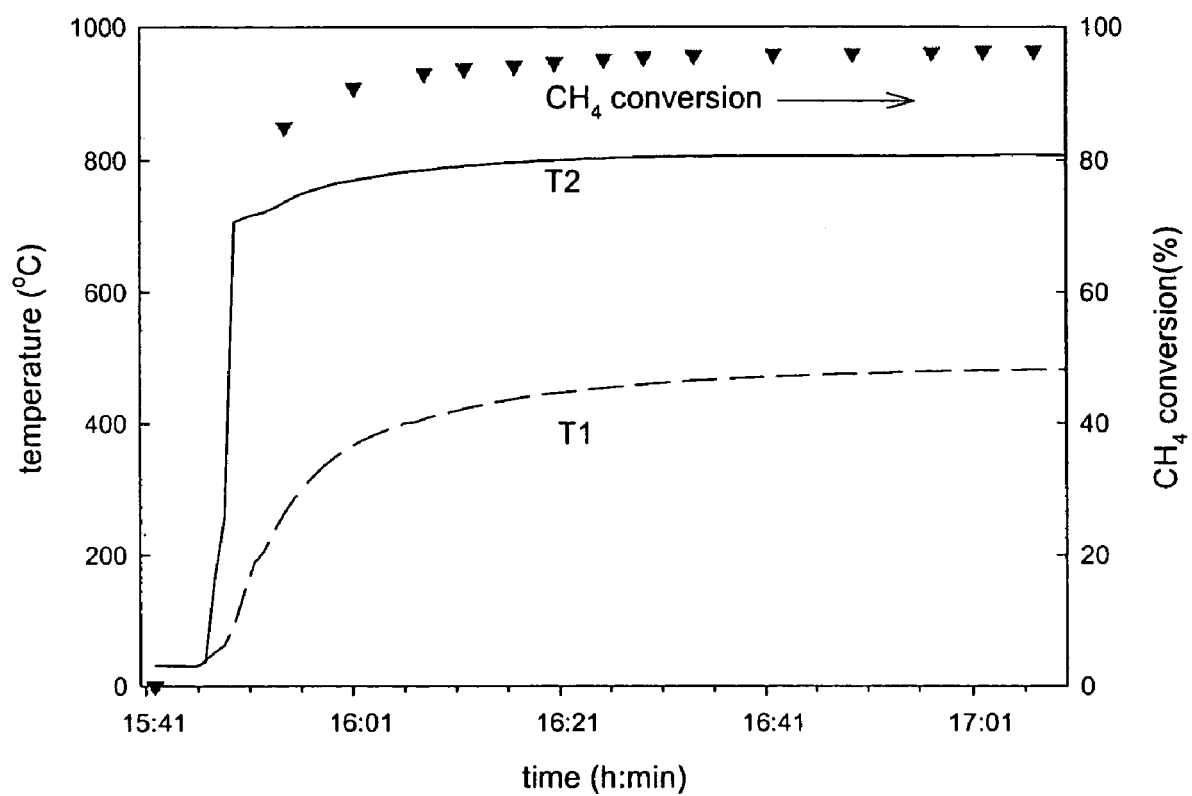
FIG. 4 is the graphical representation of the relationship of temperatures and methane conversion with time when using a heat exchanger.

The stand-alone CPOX reactor of the present invention is operated in a near adiabatic mode without any external heater. When the reactant gas mixture is fed to the reactor at room temperatures, the heat of the partial oxidation reaction can heat the reactant gas to the limited temperature only. As was disclosed in U.S. Pat. No. 5,648,582, the preheated reactant gas resulted in the significantly higher methane conversion than the reactant gas fed at room temperatures. Thermodynamics of the partial oxidation reaction dictates that the higher hydrocarbon conversion is attained at higher temperatures. As was illustrated in FIG. 1, a shell-and-tube-type heat exchanger is installed at the exit of the partial oxidation reactor to preheat the mixture of methane and air being fed to the heat exchanger at room temperatures. FIG. 4 shows temperature and methane conversion with time when using a heat exchanger combined with the partial oxidation reactor described in Example 2. The reactant gas flow rate was maintained at 182 l/min (O2 in air/CH4=0.554, GHSV=114,000 hr-1). Once the partial oxidation of methane started, the temperature of the inlet gas entering the reactor (T1 in FIG. 1) increased gradually during the heating of the heat exchanger. The conversion of methane also increased with the inlet gas temperature. At the steady state inlet gas temperature of 430° C., the conversion of methane was 96.7% with the hydrogen selectivity of 98.3%. In a separate run without the heat exchanger, the conversion of methane was 84.7% with the hydrogen selectivity of 81.7%. In this example, the flow rate of hydrogen and carbon monoxide combined in the product stream corresponds to 8.37 m3/hr. Assuming 1 m3/hr of syngas powers 1 kW capacity of fuel cell, the catalyst volume requirement of the present invention for the fuel cell application is estimated to be less than 11.5 cc/kW.

EXAMPLE 4

Surrogate fuel

The efficacy of the partial oxidation reactor 12 was tested with surrogate fuel that intended to mimic gasoline. Surrogate fuel comprises heptane (C7H16, mole fraction: 0.6), pentane (C5H12, mole fraction: 0.25) and xylene (C8H10, mole faction: 0.15). The representative chemical formula of the surrogate fuel is C6.7H14.1 with the molecular weight of 94.5 g/mole and average density of 0.684 g/cc. Surrogate fuel with the flow rate of 16 cc/min was fed to the evaporator and the evaporated fuel was mixed with 45.5 l/min of air (O2/C=0.52) before entering the reactor described in Example 2. The partial oxidation reaction was ignited by the EHC at the gas temperature of 150° C. At the steady state, the temperature of the product gas at the exit of the catalyst bed was 811° C. The product gas composition was hydrogen 23.2%, carbon monoxide 25.3%, nitrogen 49.7%, methane 0.15% and carbon dioxide 1.6% with the total flow rate of 72.3 l/min. Based on the carbon balance, the fuel conversion was 100% with the hydrogen selectivity of 86.5%.

For the experiments described in Examples 1-4 where the hydrocarbon feed was processed by the catalytic partial oxidation reactor assemblage of this invention, the ranges of process conditions defined in this invention result in carbon free operation. The catalyst after the run had very minimal deposits of unconverted hydrocarbon and it is claimed the CPOX process of this invention is operated in minimal carbon deposition.

As can be appreciated by above skilled in the art, the present invention provides an improved method of CPOX process of converting hydrocarbon feedstock of methane, natural gas, LPG, naphtha, gasoline and diesel oil to syngas. Also the present invention provides high efficacy metal monolith catalyst to process large amount of reactant gas with small volume of the catalyst making the system compact. Also provided is the hydrocarbon processing system with very little pressure drop to alleviate the compression duty. The present invention additionally provides an EHC within the reactor assemblage for the CPOX reaction to be ignited rapidly and safely with the minimum supply of electricity only during the short start-up period. Also provided is the CPOX process employing a heat exchanger to preheat the feed gas mixture resulting in almost complete conversion of hydrocarbon with high syngas selectivity.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A process for forming a mixture of hydrogen and carbon monoxide by a catalytic partial oxidation reaction in a reactor containing both an electrically heated catalyst and a noble metal washcoated metal monolith catalyst comprising:
   a) providing a feed gas mixture comprising oxygen containing gas and a hydrocarbon feedstock selected from the group consisting of methane, natural gas, LPG, naphtha, gasoline and diesel oil, said mixture being characterized by an atomic carbon to atomic oxygen ratio of between 0.7 to 1.0;
   b) passing said feed gas mixture at room temperature through a heat exchanger to be preheated, before being introduced to the reactor, by a hot product gas stream generated by the partial oxidation reaction;
   c) providing a reactor containing a first catalyst structure comprising a supported noble metal catalyst washcoated on a first metal monolith;
   d) providing an electrically heated catalyst installed in front of said first catalyst structure, the electrically heated catalyst comprising a supported noble metal catalyst washcoated on a second metal monolith having welded electrical rods at both ends within said reactor for igniting the partial oxidation reaction to produce an ignited feed gas mixture;
   e) passing said ignited feed gas mixture through said first catalyst structure so as to convert said feed gas mixture to hydrogen and carbon monoxide and heat the hydrogen and carbon monoxide by the heat of the partial oxidation reaction, said heated hydrogen and carbon monoxide comprising the hot product gas stream;
   f) passing said hot product gas stream through said heat exchanger to provide heat to said feed gas mixture.

2. The process of claim 1, wherein said oxygen containing gas comprises air.

3. The process of claim 1, wherein said oxygen containing gas comprises air with enriched oxygen content.

4. The process of claim 1, wherein said supported noble metal catalyst comprises one or combination of Pd, Pt and Ru supported on aluminum oxide promoted by cerium oxide and other alkali compounds.

5. The process of claim 4, wherein said alkali compounds comprise barium and strontium, said noble metal being present between 1 to 20 wt % of washcoat.

6. The process of claim 4, wherein said noble metal being present between 1 to 20 wt. % of washcoat.

7. The process of claim 4, wherein said supported noble metal catalyst washcoat is being present on a metal monolith between 0.01 to 0.4 g/cc of monolith.

8. The process of claim 1, wherein said metal monolith is made by alloy plate.

9. The process of claim 8, wherein said alloy plate comprises iron-chrome-aluminum alloy plate, nickel-chrome-aluminum alloy plate or nickel-chrome alloy plate.

10. The process of claim 1, wherein said metal monolith has open-channel structure, said open:channel structure has a cell density between 50 to 1000 cells per square inch.

11. The process of claim 1, wherein the space velocity is within the range of 10,000 hr-1 to 500,000 hr-1.

12. The process of claim 1, wherein said electrically heated catalyst comprises said metal monolith with both ends welded by electric wires, said metal monolith being noble metal washcoated.

13. The process of claim 3, wherein said air with enriched oxygen content has an oxygen content ranging from 21 percent to 100 percent in volume.

* * * * *

UNITED STATES PATENT AND TRADEMARK OFFICE
CERTIFICATE OF CORRECTION

PATENT NO. : 7,247,258 B2  Page 1 of 1
APPLICATION NO. : 10/735257
DATED : July 24, 2007
INVENTOR(S) : Jung et al.

It is certified that error appears in the above-identified patent and that said Letters Patent is hereby corrected as shown below:

Claim 5
Column 8, line 38 delete "20 wt % of" and insert -- 20 wt% of --

Claim 10
Column 8, line 50 delete "open:channel" and insert -- open-channel --

Signed and Sealed this

Eighth Day of September, 2009

David J. Kappos
*Director of the United States Patent and Trademark Office*